INVENTORS
BENJAMIN SCHLACHMAN
WILLIAM S. BROWER, JR.
BY
ATTORNEY

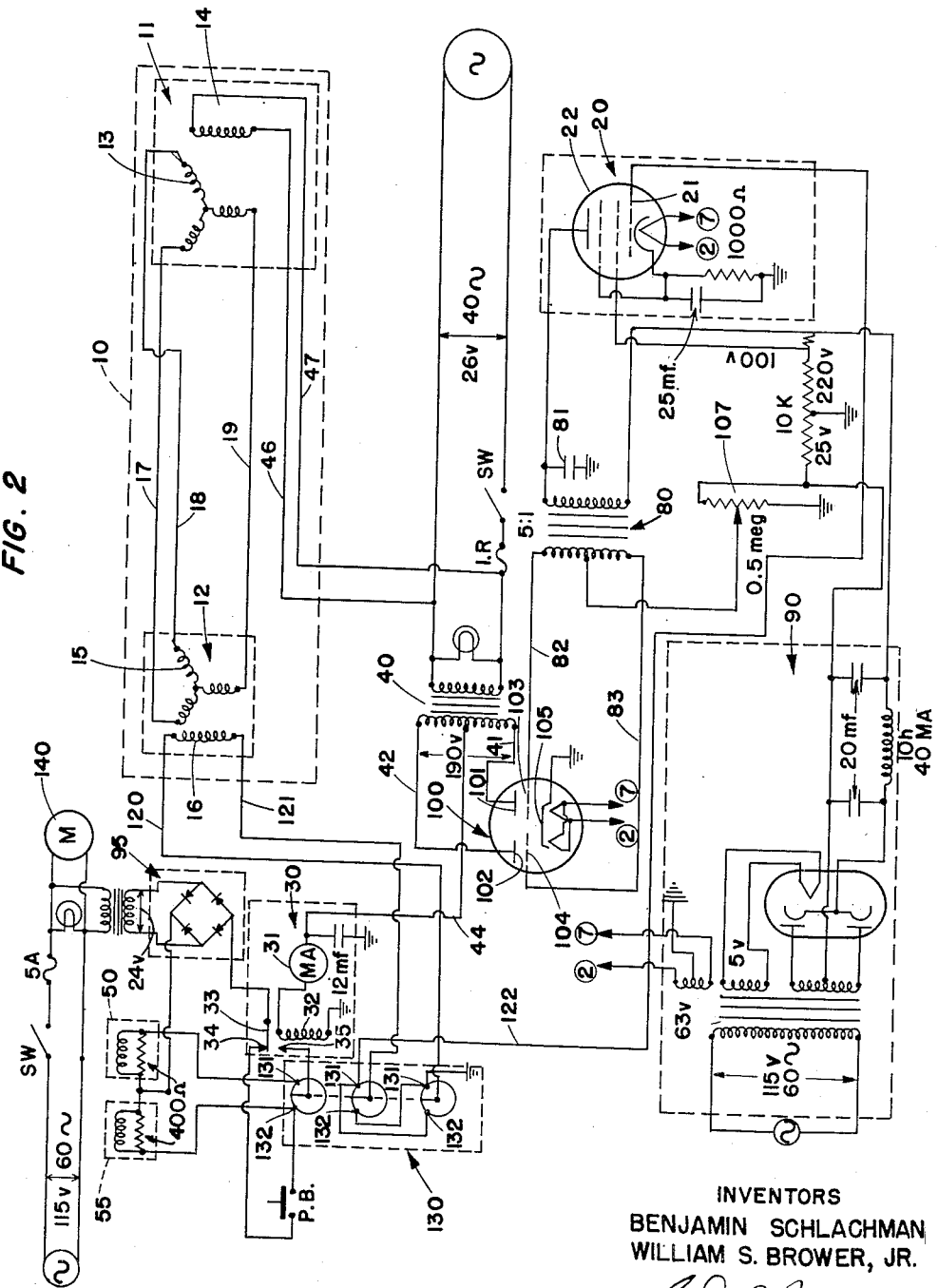

April 22, 1952 B. SCHLACHMAN ET AL 2,593,493
ELECTRONIC STRESS-STRAIN RECORDER
Filed June 10, 1949 3 Sheets-Sheet 3
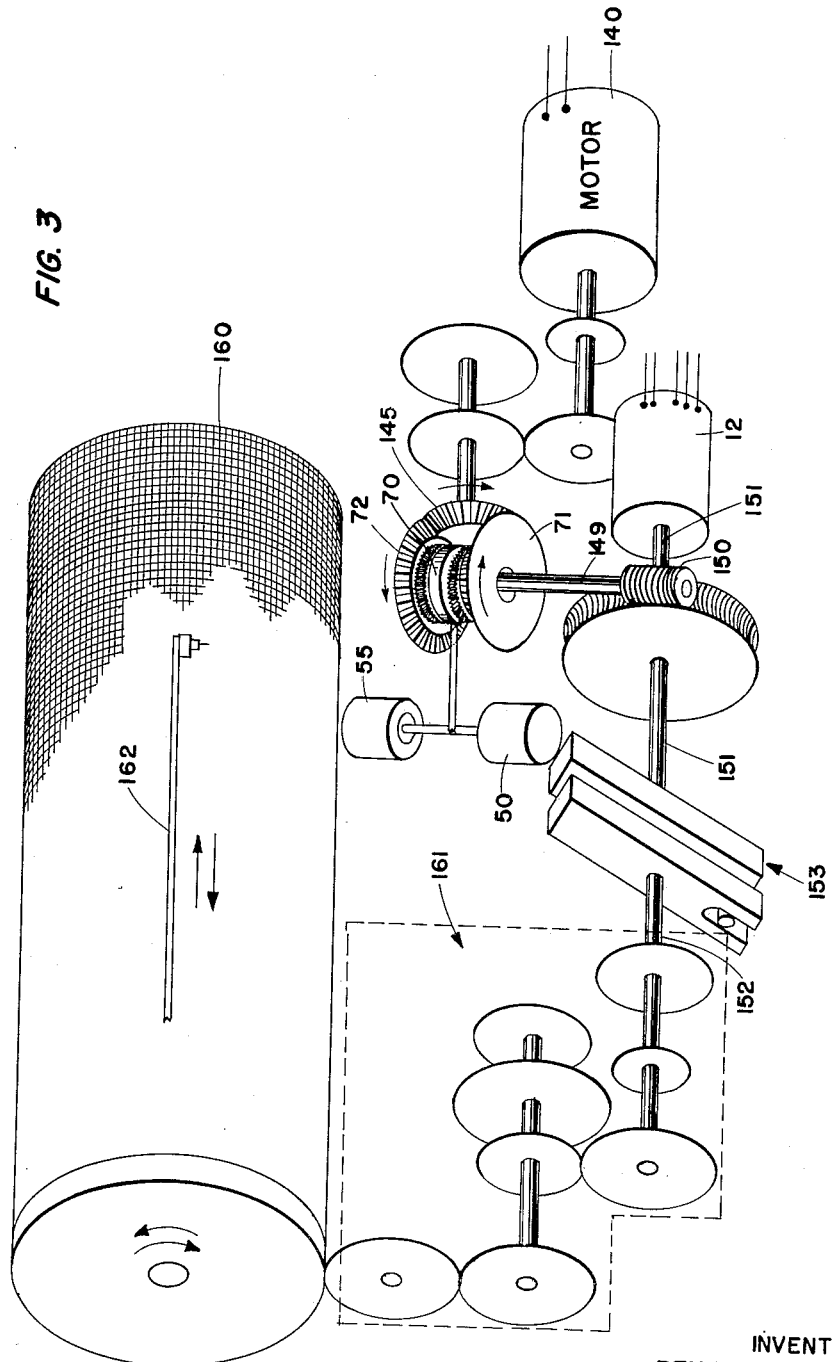
INVENTORS
BENJAMIN SCHLACHMAN
WILLIAM S. BROWER, JR.
BY
ATTORNEY Patented Apr. 22, 1952

2,593,493

UNITED STATES PATENT OFFICE 2,593,493

ELECTRONIC STRESS-STRAIN RECORDER

Benjamin Schlachman, Baltimore, Md., and
William S. Brower, Jr., Arlington, Va.

Application June 10, 1949, Serial No. 98,342

2 Claims. (Cl. 177—351)

(Granted under the act of March 3, 1883, as
amended April 30, 1928; 370 O. G. 757)

The present invention relates primarily to stress-strain recorders and more particularly to an electronically controlled compensating device for recording the deflections of an element undergoing a stress-strain test, although applicable to the recordation of mechanical movement generally.

The present recording stress-strain testers are limited to testing simple specimens for straight compression or tension with small deflections. In the present development of industrial machinery and appliances, however, it is necessary to make more elaborate tests than are permitted by these recording machines. Heretofore, when more elaborate testing was required it has been necessary to measure the deflection of parts under test with dial indicators, requiring the attention of many operators during the test and resulting in frequent errors in making the readings and plotting performance curves therefrom.

It is one object of the present invention to provide for automatically recording the extensions and compressions of specimens of the more complex type as well as the simpler, and to afford a means whereby the mechanical deflections are converted into electric impulses which are transmitted through a suitable circuit for effectuating an automatic recordation of the deflections upon a suitable recording device. To this end there is provided a means whereby the deflection of a dial type stress-strain indicator is automatically and directly converted into an electric signal which by means of an electronic circuit controls a mechanical system operating to compensate the electric signal and thereby to record the deflection of the tested elements.

Another object is to provide an electronic compensating control circuit which will effectuate the above described object by actuating a suitable mechanical linkage in response to said signal current, said linkage operating upon the signal producing means to reduce the signal current to zero and thereby correspondingly operating a recording device.

A dial type stress-strain indicator is used as the initial mechanical impulse receiving element, it responding to the deflection of the element being tested. This mechanical impulse is converted into an electric signal by means of a suitable circuit composed of a pair of synchronously connected generators in the form of a control transformer system. A suitable current is applied to the rotor of the transmitting generator which is mechanically connected to the pointer shaft of a dial indicator type stress-strain tester. The stator of this transmitter is synchronously connected to the stator of the receiving generator such that movement of the transmitting rotor out of synchronous relation with the receiving rotor as caused by the stress-strain indicator causes a voltage to be induced across the receiving rotor, but when the receiving rotor is brought into the corresponding position then existent in the transmitting rotor the voltage induced in the receiving rotor is reduced to zero. Thus, movement of the transmitting rotor induces a voltage across the receiving rotor thereby converting the mechanical movement of the element being tested into an electric signal.

The current thus generated is then amplified and applied to the grids of a suitable control vacuum tube in order to control the flow of current to a relay, the control tube being in the relay energizing circuit. The relay in turn controls the operation of a pair of solenoids, being in series in their energizing circuit. Thus, the operation of these solenoids is controlled by the signal current, all to be more fully described in detail below. The solenoids operate a clutch in a gearing system driven by a suitable servo motor or the like. This gearing system has a two-fold function: one being to rotate the drum of a recorder, the other being to turn the rotor of the receiving generator of the synchronous circuit above described to bring it into synchronism with the transmitting rotor and thus reduce the voltage induced across the receiving rotor to zero.

The operation of this system is briefly as follows: A dial indicator type stress-strain tester or similar device is applied to an element to be tested. The pointer is mechanically connected to a synchronous control transformer system, as by an axially extending shaft and suitable coupling, so that movement thereof during the test is converted into an electric impulse by said synchronous system. The signal voltage produced thereby is used to control the solenoids which in turn operate the clutch in the gearing system. Thus, so long as the receiving rotor is out of synchronism with the transmitting rotor the gearing system, through the solenoid operated clutch, moves the receiving rotor to bring it into synchronism with the transmitting rotor and simultaneously moves the recording drum in accordance with the movement imparted to the receiving rotor. When a synchronous relation between the two generators is reached, the solenoid operated clutch disengages the servo motor drum from the gear train, and the receiving rotor and recording drum remain stationary until further deflection of the element being tested causes a nonsynchronous relation between the two generators. It is therefore apparent that this device operates to continually compensate for the signal current as actuated thereby and simultaneously operates to record the amount of compensation required as a measure of the deflection of the piece being tested.

The pen arm of the recorder is responsive to the force applied to the tested element during the testing process and moves lengthwise along the recording drum proportionally to said force. Thus a record of the deflections of the element being tested is automatically plotted against the force applied thereto.

The present invention, described broadly above is hereinbelow described in detail in conjunction with the accompanying drawings, wherein like numerals refer to the same or corresponding parts in the different drawings.

Fig. 2 is a detailed wiring diagram of the circuit of the present invention; and Fig. 3 is a schematic representation of the gear train and drum recorder.

Figure 1:
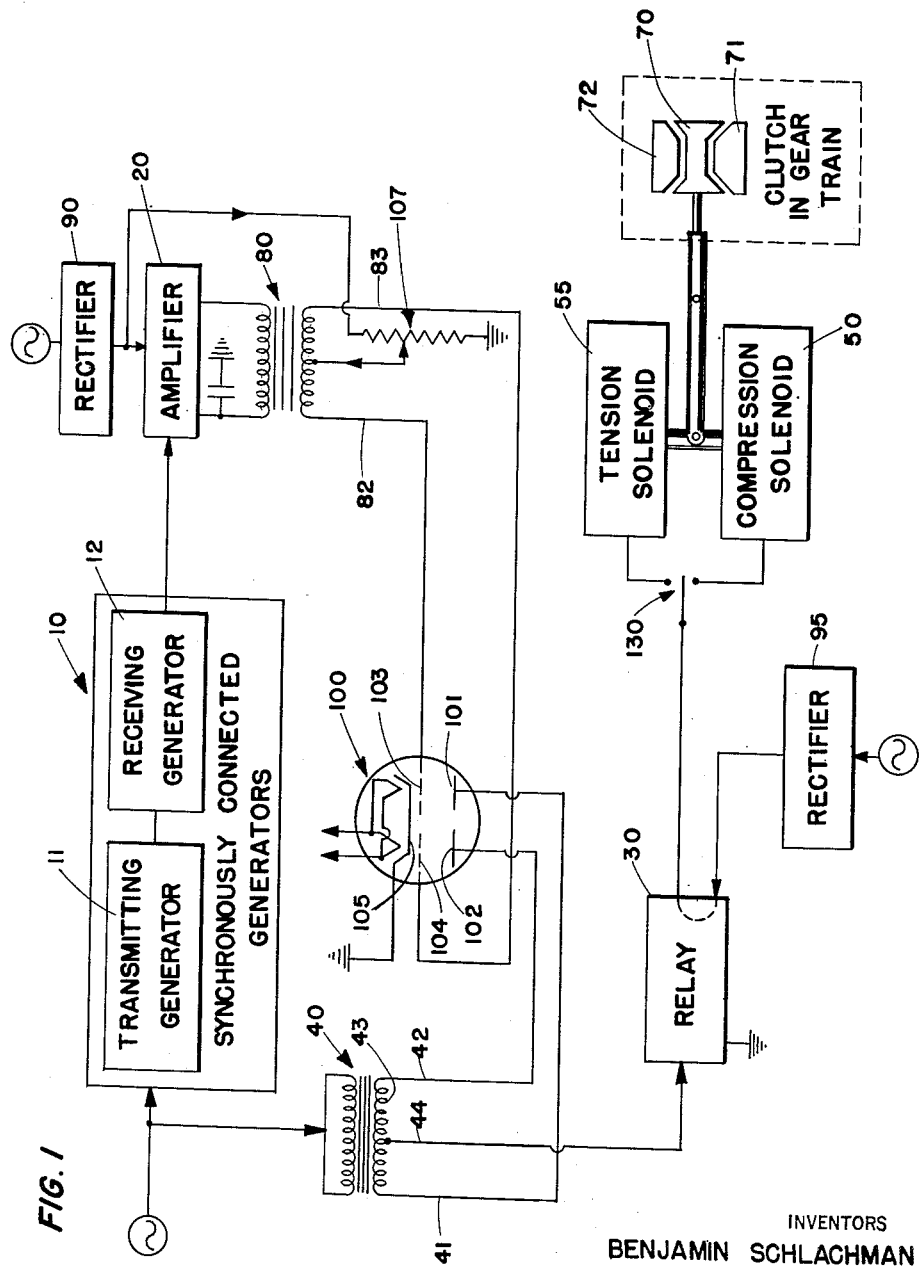
Fig. 1 is a partially schematic block representation of the circuit employed by the present invention.

Referring to Fig. 1, the signal generating circuit comprises a pair of synchronously connected generators forming a control transformer system 10 having a transmitting generator 11 with a suitable voltage, such as 26 volts at 400 cycles, applied to its rotor, and a receiving generator 12. A voltage is induced across the rotor of generator 12 when the rotor of generator 11 is caused to move out of synchronism with the rotor of generator 12, which movement is caused by the rotation of the pointer of a dial indicator type stress-strain tester applied to the transmitting rotor. The signal voltage thus induced across the rotor of receiving generator 12 is amplified in amplifying system 20.

The control circuit of relay 30 receives its operating current from transformer 40 but is controlled by the amplified signal current by means of control vacuum tube 100. The relay functions as a control of the solenoids, either compression solenoid 50 or tension solenoid 55, depending upon the position of the manually operated switch 130. The solenoids operate to cause clutch 70 to engage either gear 71 or 72 when relay 30 is energized, depending upon the position of switch 130, or to be disengaged from both gears when said relay is not activated.

As mentioned above, the relay 30 is controlled by the amplified signal current by means of vacuum tube 100, preferably type 6N7, functioning both as a rectifier and an electronic switch. Leads 41 and 42 from transformer 40 are connected to anode plates 101 and 102 of tube 100 applying preferably about 190 volts A. C. thereto, and the voltage so impressed on each of the plates being always 180° out of phase with that impressed on the other plate. The current leaving amplifier 20 is passed through a 1:5 transformer 80 and the voltage thereof is applied to the control grids 103 and 104 in tube 100. Therefore, current will flow from either filament 105 of tube 100 to plate 101 or to plate 102 then through a portion of the secondary 43 of transformer 40, and through lead 44 to activate relay 30 if grids 103 and 104 have a proper voltage applied thereof. Otherwise, relay 30 is deactivated.

Thus, grids 103 and 104 carry the voltage induced in the rotor of receiving generator 12 as amplified. When the rotor of transmitting generator 11 is turned a voltage is induced across the rotor of receiving generator 12. The current thus generated is amplified in amplifier 20, the voltage thereof is stepped up in transformer 80, and this voltage is applied to grids 103 and 104 to control the passage of current from the cathode to the plates of tube 100 and hence results in the activation of relay 30. In operation, with zero A. C. voltage applied to the grids 103 and 104 they are biased by variable resistance 107 to place relay 30 on the verge of activation. Then when either grid 103 or 104 becomes more positive and its respective plate 101 or 102 is positive with respect to the cathode 105, an increased current can flow to the relay causing it to close the circuit to the solenoids. The grids attain this increase in positive potential with respect to the cathode by means of the amplified A. C. signal current impressed thereon.

Fig. 2 is a detailed view of the entire electrical circuit which shows the synchronously connected generators 11 and 12 and their wiring connections, the transmitting stator 13 and rotor 14, and the receiving stator and rotor 15 and 16, respectively. The synchronously coupled generators 11 and 12 may be of any suitable design such as Eclipse-Pioneer Autosyn type AY-101D. Leads 120 and 121 conduct the current induced on rotor 16 to the three way gang switch 130, shown in "off" position and to be discussed fully below, and the voltage thereof is applied to amplifier 20 by means of lead 122, said amplifier being primarily a vacuum tube of type 6SJ7. Lead 122 thus impresses the voltage induced on rotor 16 on grid 21 of tube 22 effectuating an amplified output in accordance with the current induced on rotor 16. The voltage of this amplified output is stepped up 5:1 in transformer 80. This transformer, acting as a high impedance load, and the 0.01 microfarad condenser 81, cooperating therewith to filter out the high frequency currents, produce a pure sine wave of 400 cycles, the voltage of which is applied to grids 103 and 104 of tube 100 through leads 82 and 83. As explained above, when the voltage of both grid 103 and plate 101 or grid 104 and plate 102 carry a proper potential with respect to the cathode, current flows through lead 44 to energize an armature coil 32 of the relay 30 and thus cause an armature 33, which is normally engaged with an upper relay contact 34, to be moved into engagement with a lower contact 35, whereby either solenoid 50 or 55 is activated, depending on the position of switch 130, upon a sufficient flow of current to activate the relay.

The three bank selector switch 130 mentioned above has a triple throw. The center throw is the "off" position as shown in Fig. 2. Either the left or right throw will effectuate closing of the circuit connecting rotor 16 with grid 21. However, the two "on" throws are for the purpose of selectively choosing either solenoid 50 or 55 for actuation of the clutch 70, all of which will be more fully discussed hereafter in connection with the description of the mechanical gear train and its associated parts for rotating the drum recorder and the rotor 16 of receiving generator 12.

The operating current of the amplifier is supplied thereto by means of rectifier 90 employing a rectifying vacuum tube type 6X5. The 115 volt 60 cycle current source for operating the solenoids 50 and 55 is rectified by bridge rectifier 95. Other usual parts of the various conventional circuits are shown in Fig. 2 by their conventional symbols with their values indicated when of significance.

The mechanical gear train and its associated parts, mentioned above and shown schematically in Fig. 3, comprises a suitable power unit, preferably a servomotor or the like 140, connected to bevel gear 145 for rotation thereof, which in turn drives bevel gears 71 and 72 in opposite directions. Clutch 70 is keyed to shaft 149 and is slideable therealong to selectively engage, either gear 71 or 72 depending on the direction of rotation desired or stands free of either gear when no rotation is desired. Rod 149 connects clutch 70 with worm gear 150 for rotation of shaft 151. Shaft 151 operates at one end to drive rotor 16 of the synchronous receiving generator 12, and at the other end is suitably coupled to shaft 152 by means of flexible coupling 153 to drive the recording drum 160 through a variable gear box 161.

Selective clutch 70 operates between three positions: in engagement with gear 71, in engagement with gear 72, or in neutral position disengaged from either gear. The various positions of the clutch are effectuated by means of solenoids 50 and 55, operated by current supplied from bridge rectifier 95 and actuated by relay 30.

During the compression phase of the stress-strain test on an apparatus, while the load thereon is being increased, selector switch 130 is thrown to the right to stop 131 thereby closing the circuit between the rectifier 95 and the compression solenoid 50 when relay 30 is activated; during the tension stage of the test, while the load is being reduced, the switch is thrown to the left, to stop 132, thereby closing the circuit to the tension solenoid 55 when relay 30 is activated. When this circuit is closed to the compression solenoid 50, clutch 70 engages with gear 71 to rotate the rotor of receiving generator 12 in one direction; and when this circuit is closed to the tension solenoid 55 the clutch engages with gear 72 to rotate said rotor in the opposite direction. Likewise, as will be readily observed from Fig. 3, with the activation of one solenoid the recording drum 160 is rotated in one direction, while activation of the other solenoid causes said drum to be rotated in the opposite direction.

In the operation of this apparatus, a conventional dial test indicator drive may be connected to the rotor of the transmitting generator 11, and may be properly positioned upon the device to be tested in the usual manner. With the A. C. voltage on grids 103 and 104 of control tube 100 at zero, these grids are biased with D. C. current from rectifier 90 through rheostat 107 so that the current flowing through relay coil 32 as indicated by ammeter 31 places the relay on the verge of activation. The requisite biasing potential is about —4 volts when the suggested equipment and current values are used. The rotors 14 and 16 of the two synchronous generators are brought into synchronous position.

The first stage of the test is usually compression, increasing the load on the device being tested, so selector switch 130 is thrown to compression position 131. As the pressure is increased, the dial indicator causes the rotor of transmitting generator 11 to rotate out of synchronous relation with rotor 16 of the receiving generator 12, thereby inducing a voltage on said rotor. This voltage is impressed on the biased grids 103 and 104 as described above to actuate relay 30 and thereby close the compression solenoid circuit. The activation of solenoid 50 causes clutch 70 to engage gear 71 being rotated by force of motor 140. This engagement causes the clutch to rotate and thus through rod 149, which passes free through gear 71 to engage clutch 70, and worm gear 150 to rotate both the drum 160 and the rotor 16 of receiving generator 12. This rotation is designed to be in a direction to follow the rotation of rotor 14 in transmitting generator 11. Rotor 16 is thus again brought into synchronous relation with rotor 14 and the voltage across rotor 16 is thereby reduced to zero. Since there is now no signal voltage being impressed on grids 103 and 104 of tube 100, the relay becomes deenergized and the compression solenoid circuit is thereby opened. The clutch is thus forced back into neutral position by the action of the solenoid and rotation of the recording drum and receiving generator rotor 16 ceases. However, as the compression increases, the two synchronized rotors 14 and 16 again fall out of synchronous relation and the above described operation is repeated. Thus the operation of this device provides an intermittent rotation of the rotor 16 and of the recording drum 160, representing the deflection of the device being tested by rapidly following minute increments of rotation of rotor 14, while movement of the recording pen 162 along the length of the drum represents the amount of pressure applied, this latter movement being effected by any conventional means. Since in actual practice the periods of activation and deactivation of the solenoids are short the curve that is actually recorded on the drum is relatively smooth.

After the desired compression has been reached, the next step is to release the pressure, called the tension phase of the test. At this time the switch 130 is thrown to the left stop 132 to close the circuit to the tension solenoid 55. The operation of the device during the tension stage is identical to that for compression except that clutch 70 engages gear 72 during activation of this solenoid to rotate rotor 16 and drum 160 in the opposite direction from that during the compression stage. The necessity for this change is readily apparent, for rotor 16 must follow rotor 14, and rotor 14 rotates in the opposite direction during this stage from the direction in the compression stage because of the change of direction of rotation of the dial indicator. As the pressure is decreased, pen 162 moves in correspondence thereto. Thus a complete curve of the stress-strain characteristics of the device being tested is automatically recorded on drum 160.

In the preferred embodiment of this invention, the entire apparatus except the transmitting generator 11 and its associated dial type stress-strain indicator are included within a unitary structure, the connection necessary between these two units being merely a five strand cable including leads 17, 18, 19, 46 and 47. Because of the flexible connection between the two units and the compactness and lightness of the transmitting generator unit in the present invention, rather than the mechanical linkages and bulkiness of the conventional stress-strain recording testers, many advantages are gained over the prior art: it may be quickly installed on various elements to be tested; the deflection of parts heretofore not easily accessible may be readily obtained; the needle of the dial indicator offers a convenient check of the recorder and its proper functioning; the same transmitting generator unit can be applied to many variously shaped and formed elements; the dial indicator unit can be mounted directly on the element being tested; and many other advantages will be readily apparent to those skilled in the art.

The foregoing description presents a preferred embodiment of the invention, but various modifications within the scope of this invention as defined by the following claims will be apparent to those skilled in the art.

The invention described herein may be manufactured and used by or for the Government of the United States of America for governmental purposes without the payment of any royalties thereon or therefor.

What is claimed is:

1. An electrical compensating device comprising a control transformer circuit for generating a voltage signal in response to mechanical movements, said circuit comprising synchronously connected transmitting and receiving generators, means for amplifying said signal, a control vacuum tube comprising an anode plate element, a cathode, and a control grid, said amplified signal voltage being applied to said control grid, a relay, an operating circuit therefor, said tube being in series with said relay in its operating circuit through electrical connections with the plate and cathode of said tube, said control grid, by control of the current flowing between said cathode and said plate, controlling the operation of said relay, means for biasing said grid to facilitate control of said relay by said signal voltage, a pair of solenoids, a circuit for operating said solenoids, said circuit being controlled by said relay, a switching means independent of said relay having an "off" position for preventing application of said signal voltage to said grid and having two "on" positions for applying said signal voltage to said grid and for selectively including one of said solenoids in said solenoid operating circuit, a mechanical linkage, a motor operating said linkage, a pair of clutches in said linkage individually operated by said solenoids, and a recording drum, said linkage operating on said receiving generator to reduce the signal voltage substantially to zero and simultaneously operating said recording drum, the activation of one solenoid causing movement of said linkage through said clutch in one direction, activation of the other solenoid causing movement thereof through said clutch in the opposite direction, the deactivation of both solenoids resulting in said clutch being positioned in a neutral position to eliminate movement of said linkage therethrough.

2. An electrical compensating device comprising a control transformer for generating a voltage signal in response to mechanical movement of either of two directional senses, a relay, an electronic tube having an input circuit responsive to said signal and an output circuit controlling said relay, a pair of solenoids, said solenoids being controlled by said relay, a switching means independent of said relay having two "on" positions for applying said signal voltage to said tube and for selecting one or the other of said solenoids to be controlled by said relay, and an independently driven mechanical linkage having a selective clutch means controlled by the solenoids, said linkage operating on the control transformer as a follow-up means to reduce the signal voltage substantially to zero through the switch selected activation of one solenoid or the other, one solenoid causing through selective clutch means action follow-up in one directional sense, the other solenoid causing through selective clutch means action follow-up in the other directional sense.

BENJAMIN SCHLACHMAN.
WILLIAM S. BROWER, JR.

REFERENCES CITED

The following references are of record in the file of this patent:

UNITED STATES PATENTS

| Number | Name | Date |
| --- | --- | --- |
| 1,350,705 | Clarke | Aug. 24, 1920 |
| 2,415,680 | Hoyt | Feb. 11, 1947 |
| 2,439,094 | Miles | Apr. 6, 1948 |